United States Patent [19]

Hopperdietzel

[11] Patent Number: 4,798,230

[45] Date of Patent: Jan. 17, 1989

[54] HEATABLE PLASTIC HOSE

[75] Inventor: Siegfried Hopperdietzel, Selb, Fed. Rep. of Germany

[73] Assignee: Rehau AG + Co., Rehau, Fed. Rep. of Germany

[21] Appl. No.: 88,963

[22] Filed: Aug. 21, 1987

[30] Foreign Application Priority Data

Aug. 22, 1986 [DE] Fed. Rep. of Germany ... 8622603[U]

[51] Int. Cl.$^4$ .................................................. F16L 11/12
[52] U.S. Cl. .................................... 138/103; 219/335
[58] Field of Search .................... 138/33, 103, 125; 174/47; 219/281, 335, 336, 544

[56] References Cited

U.S. PATENT DOCUMENTS

| 2,704,556 | 3/1955 | Blish | 138/DIG. 8 |
| 2,998,028 | 8/1961 | Rohde | 138/DIG. 8 |
| 3,500,867 | 3/1970 | Elson | 138/125 |
| 4,038,519 | 7/1977 | Foucras | 138/33 X |
| 4,194,536 | 3/1980 | Stine et al. | 138/33 X |
| 4,214,147 | 7/1980 | Kraver | 138/33 X |
| 4,218,607 | 8/1980 | Noland | 138/33 X |
| 4,463,779 | 8/1984 | Wink et al. | 138/DIG. 8 |

FOREIGN PATENT DOCUMENTS

| 2008400 | of 1971 | Fed. Rep. of Germany . | |
| 8520557 | 1/1986 | Fed. Rep. of Germany . | |
| 1552682 | 11/1968 | France | 138/33 |
| 2165269 | of 1973 | France . | |
| 443312 | 2/1966 | Japan | 138/33 |
| 55-125815 | of 1977 | Japan . | |
| 317654 | of 1957 | Switzerland . | |

Primary Examiner—Mark J. Thronson
Attorney, Agent, or Firm—Spencer & Frank

[57] ABSTRACT

A heatable plastic hose for transporting fluids, particularly liquids, includes a tubular hose having a cross-sectional center point and a hose wall which defines, along the inner surface thereof, a longitudinal cavity having a cross-sectional center point which is laterally offset from the cross-sectional center point of the tubular hose, the tubular hose having, in cross-section, a first wall portion and a second wall portion, the first wall portion being thicker than the second wall portion; and a heating conductor wire which is longitudinally coextensive with the tubular hose and is embedded in the first wall portion.

12 Claims, 1 Drawing Sheet

HEATABLE PLASTIC HOSE

BACKGROUND OF THE INVENTION

1. Field of the Invention

The present invention relates to a plastic hose for transporting fluids and more particularly to a heatable plastic hose for transporting liquids in which a plastic hose is connected over its length with a heating conductor wire useful, for example, for preventing freezing of liquids contained in windshield washer systems of motor vehicles.

2. Background of the Art

Federal Republic of Germany Utility Model Patent No. 85/20,557.5 discloses a hose for transporting liquids. A heating cable is positioned next to a flexible plastic hose and the positioning is maintained by means of a plaited structure, which surrounds the cable and hose and combines both parts into one connected unit. At the respective ends of this unit, a special termination of the plaited structure is provided which prevents unraveling of the plaited structure.

This prior art hose is complicated to manufacture, however, because two individual elements must be combined into a unit by forming the plaited structure around them. Another drawback of the hose is that the plaited structure is pliable and the heating conductor cable fixed to the plastic hose by way of the plaited structure may be displaced by the application of pressure resulting in possible mechanical damage to the cable which could render the unit unheatable. Moreover, the plaited structure is permeable to moisture and dirt so that soiling and corrosive damage of the heating conductor cable may negatively influence the performance and service life of the heatable hose unit.

SUMMARY OF THE INVENTION

The present invention has as its object to provide an easily manufactured, heatable plastic hose article for transporting fluids, particularly liquids, in which a heating conductor wire is fixedly positioned along a plastic hose without requiring a plaited structure to maintain the positioning and which is distinguished by low energy consumption.

This object is achieved according to the present invention by providing a heatable plastic hose for transporting fluids including a tubular hose having a cross-sectional center point and a hose wall which defines, along the inner surface thereof, a longitudinal cavity having a cross-sectional center point which is laterally offset from the cross-sectional center point of the tubular hose. The tubular hose has, in cross-section, first and second wall portions, the first wall portion being thicker than the second wall portion. An elongate heating conductor wire or cable, which is longitudinally coextensive with the tubular hose, is embedded in the thicker first wall portion. Such a heating conductor wire is used as a resistance heater as is well known in the art.

The heating conductor wire is preferably spaced apart from the longitudinal cavity in such a manner that a first hose wall region defined between the longitudinal cavity and the heating conductor wire has a thinner cross-section than a second hose wall region defined between the heating conductor wire and the outer surface of the tubular hose. Such a configuration provides a particularly advantageous low consumption of energy.

Such a configuration is simple to manufacture since the hose with the offset cavity and the heating conductor wire positioned in the thicker first wall portion can be produced by molding the plastic hose around the heating conductor wire in one process stage, for example, by way of extrusion. During the exemplary extrusion process, the heating conductor wire is passed through a transverse injection head directly into the extruded matter and is encased by the molten plastic in the thicker first wall portion. When cooled to solidify the molten plastic, the heating conductor wire is fixed in the plastic structure at a predetermined spacing from the cavity and is undisplaceably held in position within the hose structure. Due to the fact that the plastic contacts and surrounds the heating conductor wire, the latter is well protected against mechanical or corrosive damage and against soiling.

The heatable plastic hose according to the invention is thus preferably manufactured in an extrusion process. In such a process, the heating conductor wire or cable is embedded within the hose rather than the prior art technique of externally surrounding the heating conductor cable and the hose with a tubular plaited structure having the abovedescribed drawbacks. Elimination of an external, longitudinal plaited structure eliminates the need for a termination of the plait since unraveling of the plait is no longer a problem.

The hose material may be any moldable plastic material whether natural or synthetic, thermoplastic or thermosetting, a polymer or a resin. Preferably, the moldable plastic is an extrudable plastic. Most preferably the extrudable plastic is a thermoplastic polymer, such as polyethylene or polyvinylchloride, polyurethane etc.

In special cases, it may be advantageous to insert a reinforcement means in the hose cavity and/or in the hose wall surrounding the heating conductor wire and the hose cavity. This may be of advantage, for example, for longer hoses and may be necessary for hoses to be subjected to rigorous use as in military vehicles. The reinforcement means can be, for example, a plaited, braided, woven or wrapped sleeve of, for example, metal, metal alloy or fiberglass strands, strips or sheets, and can be incorporated into the structure during molding so as to be integral to the structure. Preferably, the reinforcement means is inserted by means of a transverse injected head during an extrusion process and, preferably, is a plaited reinforcement and may be made of any suitable material known in the art, depending on the end use contemplated.

BRIEF DESCRIPTION OF THE DRAWING

Further objects and advantages of the present invention and the structure and operation of the heatable plastic hose will become apparent to those skilled in the art of hose manufacture from the following description taken in conjunction with the drawing figure to which reference should be had for a better understanding of the invention.

DESCRIPTION OF THE PREFERRED EMBODIMENTS

Figure 1:
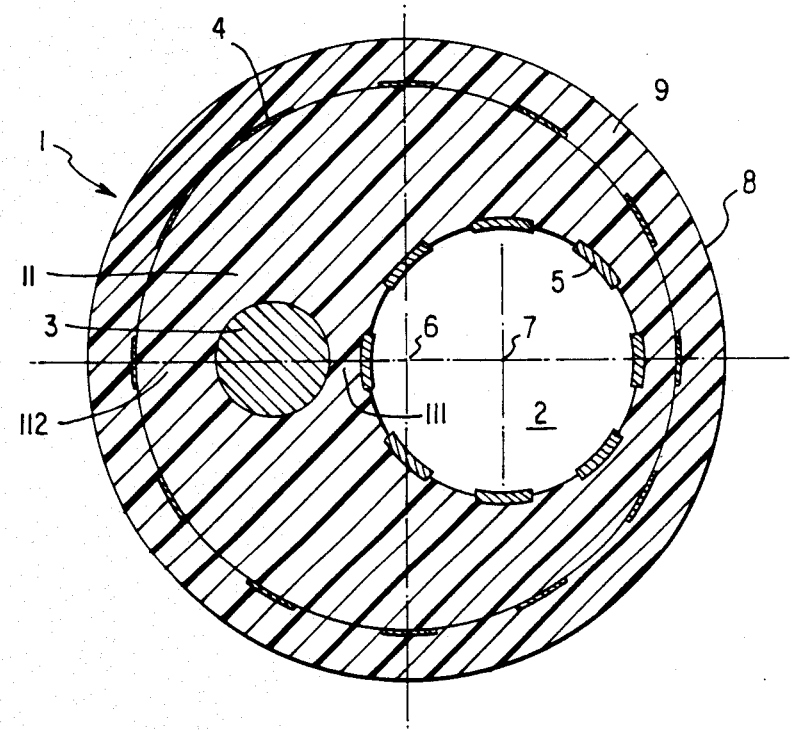
FIG. 1 is a cross-sectional view of a most preferred embodiment of the inventive heatable plastic hose.
Figure 2:
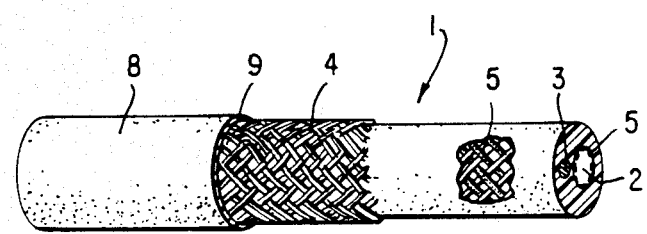
FIG. 2 is breakaway plan side view of the inventive heatable plastic hose of FIG. 1.

One embodiment of the heatable plastic hose for transporting liquids according to the invention is shown in cross-section in the drawing. Heatable plastic hose 1 includes a tubular hose 8 having a hose wall 9, and having, in cross-section, a center point 6, and defining a longitudinal cavity 2 which is laterally offset and has, in cross-section, a center point 7. As a result of the offset, tubular hose 8 has a first wall portion 11 having a thickened cross-section. A heating conductor wire 3 is embedded in first wall portion 11. As may be seen in the drawing, a first hose wall region 111, defined between longitudinal cavity 2 and heating conductor wire 3, is noticeably thinner than a second hose wall region 112, defined between heating conductor 3 and the outer surface of tubular hose 8.

A tubular reinforcing structure 4 is indicated at a predetermined distance below the outer surface of tubular hose 8 and is inserted into the hose wall 9 of tubular hose 8 in such a manner that longitudinal cavity 2, as well as heating conductor wire 3, are not in contact with the tubular reinforcing structure 4. By spacing apart the components in this way, tubular reinforcing structure 4 may be, for example, a plaited metal wire structure 4 as shown, since the spacing precludes corrosion from liquids flowing in cavity 2 and disadvantageous dissipation of heat energy due to contact with the heating conductor wire 3.

A further tubular reinforcing structure 5 is positioned within and coextensively with longitudinal cavity 2 and is at least partially embedded in the inner surface of the tubular hose 8, which inner surface defines the longitudinal cavity 2. Tubular reinforcing structure 5 contacts the liquid being transported when the heatable plastic hose 1 is used, unless it is totally embedded in hose wall 9, and should therefore generally be fabricated of a material which is inert to the liquid. For example, tubular reinforcing structure 5 may be a woven sleeve 5 as shown which is made of fiberglass and useful when the liquid transported in use is water or a windshield washing composition.

The present disclosure relates to the subject matter disclosed in Federal Republic of Germany Patent Application No. 86 22 603.7, filed August 22nd, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A heatable plastic hose for transporting fluids, said hose having only a single longitudinal cavity defined therein, comprising:
    a tubular hose wall having a cross-sectional center point which defines, along the inner surface thereof, only a single longitudinal cavity having a cross-sectional center point which is laterally offset from the cross-sectional center point of the tubular hose wall, the tubular hose wall having, in cross-section, a first wall portion and a second wall portion, the first wall portion being thicker than the second wall portion; and
    a heating conductor wire which is longitudinally coextensive with and parallel to the tubular hose wall and is completely embedded in the first wall portion.

2. The heatable plastic hose according to claim 1, wherein a first hose wall region is defined between the heating conductor wire and the longitudinal cavity and a second hose wall region is defined between the heating conductor wire and the outer surface of the tubular hose wall, and wherein the first hose wall region is thinner in cross-section than the second hose wall region.

3. The heatable plastic hose according to claim 1, further comprising means for reinforcing the tubular hose wall.

4. The heatable plastic hose according to claim 3, wherein the means for reinforcing the tubular hose wall comprises a first tubular reinforcing structure extending coextensively with and being embedded in the tubular hose wall at a predetermined distance inwardly of the outer surface of the tubular hose wall and outwardly of the heating conductor wire, which predetermined distance is selected so that the first tubular reinforcing structure does not contact the heating conductor wire and does not contact the longitudinal cavity.

5. The heatable plastic hose according to claim 4, wherein the first tubular reinforcing structure is a first plaited structure.

6. The heatable plastic hose according to claim 5, wherein the first plaited structure is comprised of strands or strips composed of at least one inorganic material selected from a metal, an alloy, and fiberglass.

7. The heatable plastic hose according to claim 4, wherein the means for reinforcing the tubular hose wall further comprises a second tubular reinforcing structure positioned within and coextensive with the longitudinal cavity and being at least partially embedded in the inner surface of the tubular hose wall.

8. The heatable plastic hose according to claim 7, wherein the second tubular reinforcing structure is a second plaited structure.

9. The heatable plastic hose according to claim 8, wherein the second plaited structure is comprised of strands or strips composed of at least one inorganic material selected from a metal, an alloy, and fiberglass.

10. The heatable plastic hose according to claim 3, wherein the means for reinforcing the tubular hose wall comprises a tubular reinforcing structure positioned within and coextensively with the longitudinal cavity, and being at least partially embedded in the inner surface of the tubular hose wall.

11. The heatable plastic hose according to claim 10, wherein the tubular reinforcing structure is a plaited structure.

12. The heatable plastic hose according to claim 11, wherein the plaited structure is comprised of strands or strips composed of at least one inorganic material selected from a metal, an alloy, and fiberglass.

* * * * *